US012427860B2

(12) United States Patent
Bessho

(10) Patent No.: US 12,427,860 B2
(45) Date of Patent: Sep. 30, 2025

(54) WORK VEHICLE

(71) Applicant: Kubota Corporation, Osaka (JP)

(72) Inventor: Hiroki Bessho, Sakai (JP)

(73) Assignee: Kubota Corporation, Osaka (JP)

( * ) Notice: Subject to any disclaimer, the term of this patent is extended or adjusted under 35 U.S.C. 154(b) by 207 days.

(21) Appl. No.: 18/377,427

(22) Filed: Oct. 6, 2023

(65) Prior Publication Data

US 2024/0157789 A1   May 16, 2024

(30) Foreign Application Priority Data

Nov. 14, 2022   (JP) ................................. 2022-181872

(51) Int. Cl.
| | |
|---|---|
| *B60K 26/02* | (2006.01) |
| *B60K 23/00* | (2006.01) |
| *B60K 26/00* | (2006.01) |
| *B60K 35/10* | (2024.01) |
| *B60R 21/13* | (2006.01) |

(52) U.S. Cl.
CPC .............. *B60K 26/02* (2013.01); *B60K 23/00* (2013.01); *B60K 26/00* (2013.01); *B60K 35/10* (2024.01); *B60K 2360/61* (2024.01); *B60R 21/13* (2013.01); *B60Y 2200/20* (2013.01)

(58) Field of Classification Search
CPC ........ B60K 26/02; B60K 23/00; B60K 26/00; B60K 2360/61; B60K 35/10; B60R 21/13; B60Y 2200/20
USPC ............................................................ 701/1
See application file for complete search history.

(56) References Cited

U.S. PATENT DOCUMENTS

| | | | | |
|---|---|---|---|---|
| 10,821,829 | B2 * | 11/2020 | Foster .................. | G05D 1/0278 |
| 11,598,397 | B2 * | 3/2023 | Kolstrup ................. | F16H 15/28 |
| 11,697,414 | B2 * | 7/2023 | Simmons ........ | B60W 30/18036 |
| | | | | 701/41 |
| 11,841,067 | B2 * | 12/2023 | Owada .................... | F16H 59/44 |

(Continued)

FOREIGN PATENT DOCUMENTS

| | | | |
|---|---|---|---|
| DE | 112013000102 T5 * | 2/2015 | ................ B60L 7/14 |
| DE | 102018208500 A1 | 12/2019 | |

(Continued)

OTHER PUBLICATIONS

Overview:engine speed control-remote. Navistar Features. (2017). https://www.international.com/-/media/Project/TratonGroup/International/International/Vehicles/Resources/Tem-Body-Builder/Engine-Media/EPA-17-International-A26/A26_AESC_Remote_.pdf?rev=ae6da6ed31b641a4a000d64927cb9359 (Year: 2017).*

*Primary Examiner* — Ramya P Burgess
*Assistant Examiner* — Keith A von Volkenburg
(74) *Attorney, Agent, or Firm* — The Webb Law Firm

(57) ABSTRACT

A work vehicle includes a travel body having a rear section provided with a loading platform on which cargo is placeable, and the travel body includes a motor section; a travel device; a driving section rideable by a driver; at least one speed change operation tool configured to give a command regarding a speed change operation; and a transmission device configured to change a speed of motive power of the motor section and transmit the changed motive power to the travel device, and switch a speed change state based on the command from the at least one speed change operation tool. The at least one speed change operation tool includes a main operation tool provided in the driving section, and an auxiliary operation tool provided at a location in the travel body different from the driving section.

8 Claims, 4 Drawing Sheets

(56) References Cited

U.S. PATENT DOCUMENTS

| | | | | |
|---|---|---|---|---|
| 11,939,743 B2* | 3/2024 | Harada | ................... | E02F 9/265 |
| 2011/0178684 A1* | 7/2011 | Umemoto | ............. | F16H 61/431 |
| | | | | 477/115 |
| 2017/0355264 A1 | 12/2017 | Foster et al. | | |
| 2024/0188485 A1* | 6/2024 | Matsuda | .............. | A01D 34/824 |

FOREIGN PATENT DOCUMENTS

| | | | |
|---|---|---|---|
| JP | 5069669 | B2 | 11/2012 |
| JP | 201429215 | A | 2/2014 |
| JP | 202260945 | A | 4/2022 |
| JP | 7545863 | B2 * | 9/2024 |

* cited by examiner

WORK VEHICLE

CROSS-REFERENCE TO RELATED APPLICATION

This application claims priority to Japanese Patent Application No. 2022-181872 filed Nov. 14, 2022, the disclosure of which is hereby incorporated by reference in its entirety.

BACKGROUND OF THE INVENTION

1. Field of the Invention

The present invention relates to a work vehicle in which a loading platform on which cargo can be loaded is included in a rear section of a travel body.

2. Description of Related Art

A conventional work vehicle having the above configuration includes a travel body having a boarding and driving section that a driver boards, and this boarding and driving section includes an operation lever, an operation pedal, or the like for changing the moving speed (vehicle speed) of the travel body (e.g., see JP 2022-60945A).

JP 2022-60945A is an example of related art.

The work vehicle with the above configuration performs work with cargo loaded on the loading platform in some cases. In some cases, the work vehicle repeatedly performs a task of supplying some of the cargo loaded on the loading platform to a predetermined location in a field, and thereafter moving the travel body slightly and supplying some of the cargo to a predetermined location in the field again. Also, the work vehicle performs a task of collecting and loading cargo placed in the field at intervals on the loading platform while moving the travel body little by little.

However, in the conventional configuration described above, a speed change lever, an operation pedal, or the like for performing a speed change operation is provided in the driving section of the travel body, and therefore every time the driver loads or unloads cargo, the driver needs to board and disembark from the driving section of the travel body to perform the speed change operation. For this reason, there has been a disadvantage in that operation becomes cumbersome and work efficiency decreases.

SUMMARY OF THE INVENTION

In view of the above, it has been desired to enable performing the operation of repeatedly moving and stopping the travel body as described above without any trouble.

A characteristic configuration of the work vehicle according to the present invention includes a travel body having a rear section provided with a loading platform on which cargo is placeable, in which the travel body includes: a motor section; a travel device; a driving section rideable by a driver; at least one speed change operation tool configured to give a command regarding a speed change operation; and a transmission device configured to change a speed of motive power of the motor section and transmit the changed motive power to the travel device, and switch a speed change state based on the command from the at least one speed change operation tool, and the at least one speed change operation tool includes a main operation tool provided in the driving section, and an auxiliary operation tool provided at a location in the travel body different from the driving section.

According to the present invention, when the driver is traveling while seated in the driving section, the driver can efficiently perform a speed change operation by operating the main operation tool located in the driving section. Then, when the driver disembarks from the travel body to load or unload cargo onto or from the loading platform or the like, the driver disembarks from the driving section, moves to the outside of the travel body, and loads or unloads the cargo or the like. At this time, even if the driver repeatedly performs a task of loading or unloading the cargo and a task of moving the travel body over a short distance, by operating the auxiliary operation tool, the driver can switch the speed change state of the transmission device without returning to the driving section.

Accordingly, when repeatedly moving the travel body or the like, the driver can perform a speed change operation from the outside of the travel body without returning to the driving section each time, and therefore can perform the operation of repeatedly moving and stopping the travel body without any trouble.

In the present invention, it is preferable that the auxiliary operation tool is provided on a lateral side of a body of the work vehicle.

According to this configuration, the driver can switch the speed change state of the transmission device to repeatedly move and stop the travel body by operating the auxiliary operation tool located on the lateral side of the vehicle body. The driver can move the travel body forward or in reverse while being laterally outside the travel body, and thus there is no risk that the travel body will come into contact with the driver's body.

In the present invention, it is preferable that the driving section is provided with a ROPS frame, and the auxiliary operation tool is provided on the ROPS frame.

According to this configuration, the ROPS frame protects the driver, for example, in the event of a rollover, and is a highly rigid member. Also, the auxiliary operation tool can be supported in a stable state by using such a ROPS frame.

In the present invention, it is preferable that the auxiliary operation tool is provided on the loading platform.

According to this configuration, when loading and unloading cargo onto and from the loading platform, the auxiliary operation tool provided on the loading platform can be operated to repeatedly move and stop the travel body, and the driver can perform the task without a large amount of movement.

In the present invention, it is preferable that the auxiliary operation tool is provided at a rear end portion of the loading platform.

According to this configuration, for example, when the driver repeatedly performs a task of loading and unloading cargo onto and from the loading platform and a task of moving the vehicle forward little by little, the driver can perform the tasks efficiently by operating the auxiliary operation tool from the rear of the travel body.

In the present invention, it is preferable that in response to a travel command from the auxiliary operation tool, the transmission device switches to a low-speed travel state approximately corresponding to a walking speed.

According to this configuration, when the driver moves the travel body while being on the outside of the travel body, the driver can safely perform the task because the travel body moves at approximately the same speed as the walking speed.

In the present invention, it is preferable that the auxiliary operation tool is a push-operated switch configured to give a travel command in response to being pushed.

According to this configuration, since the travel body can be moved with a push operation, the operation can be performed easily.

In the present invention, it is preferable that the auxiliary operation tool is a lever switch configured to switch between a neutral state and a travel command state, and biased to return to the neutral state.

According to this configuration, the travel body can be moved with an operation of switching the lever switch to the travel command state, and in response to the operation being stopped and the hand being removed, the vehicle enters the neutral state and stops traveling, and therefore there is no risk of erroneous operation, and operation can be performed safely.

DESCRIPTION OF THE INVENTION

Figure 1:
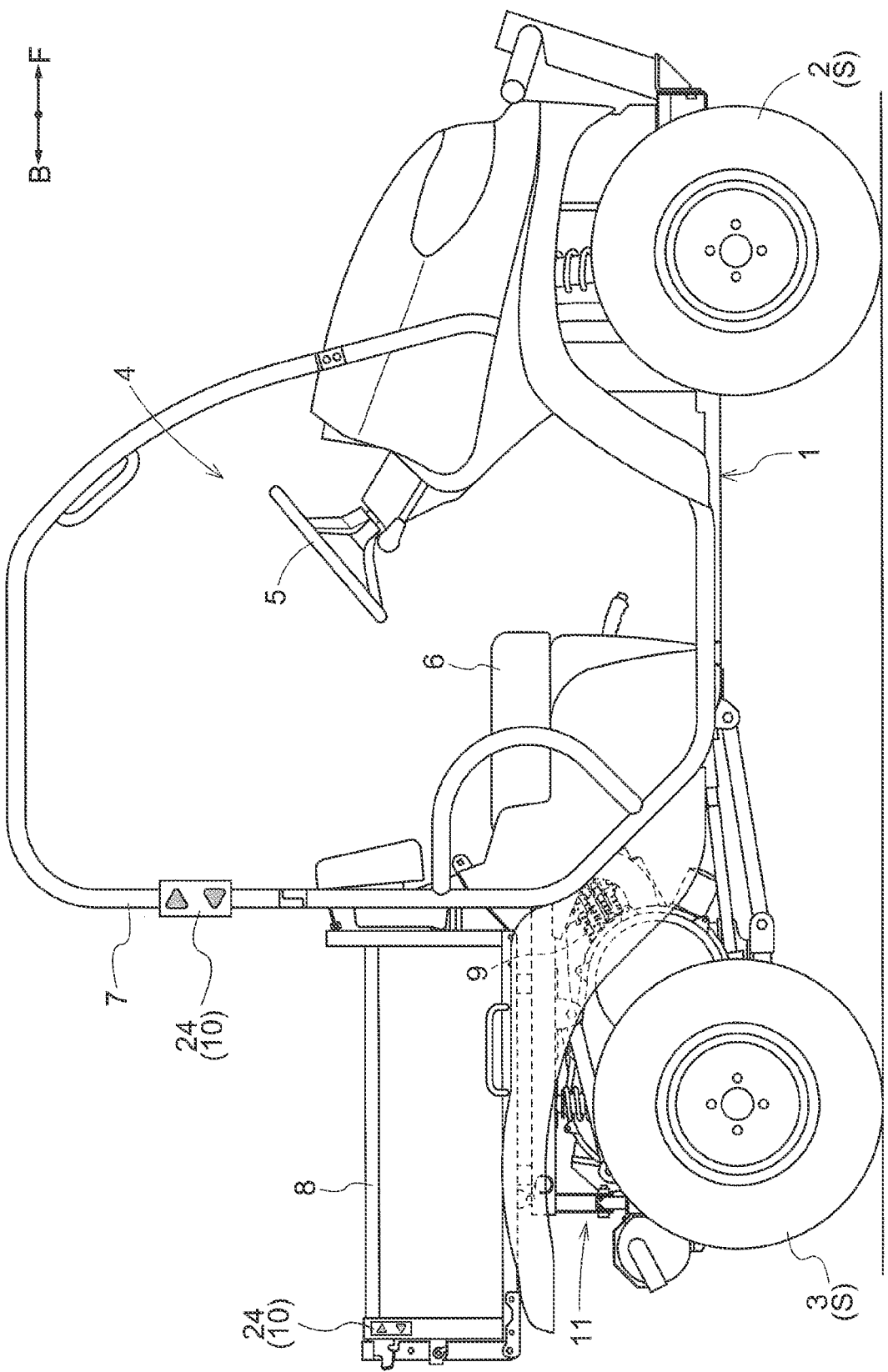
FIG. 1 is a side view of a work vehicle.

Embodiments of the present invention will be described below with reference to the drawings. FIG. 1 is a right side view showing the entirety of a work vehicle according to the present invention. The direction [F] shown in FIG. 1 is defined as the frontward direction of the travel body 1, the direction [B] is defined as the rearward direction of the travel body 1, the direction toward the front side of the page is defined as the rightward direction of the travel body 1, and the direction toward the back side of the page is defined as the leftward direction of the travel body 1.

The work vehicle has a travel body 1, in which a pair of left and right front wheels 2 serving as a travel device S are drivably and steerably equipped, and a pair of left and right rear wheels 3 serving as a travel device S are drivably equipped. The front section of the travel body 1 includes a driving section 4. The driving section 4 includes a steering wheel 5 for steering the front wheels 2, and a driver's seat 6. The driving section 4 is protected by a ROPS frame 7. The rear side of the driving section 4 is provided with a loading platform 8. An engine 9 serving as a motor section is provided below the loading platform 8.

[Power Transmission to Front Wheels 2 and Rear Wheels 3]

Figure 2:
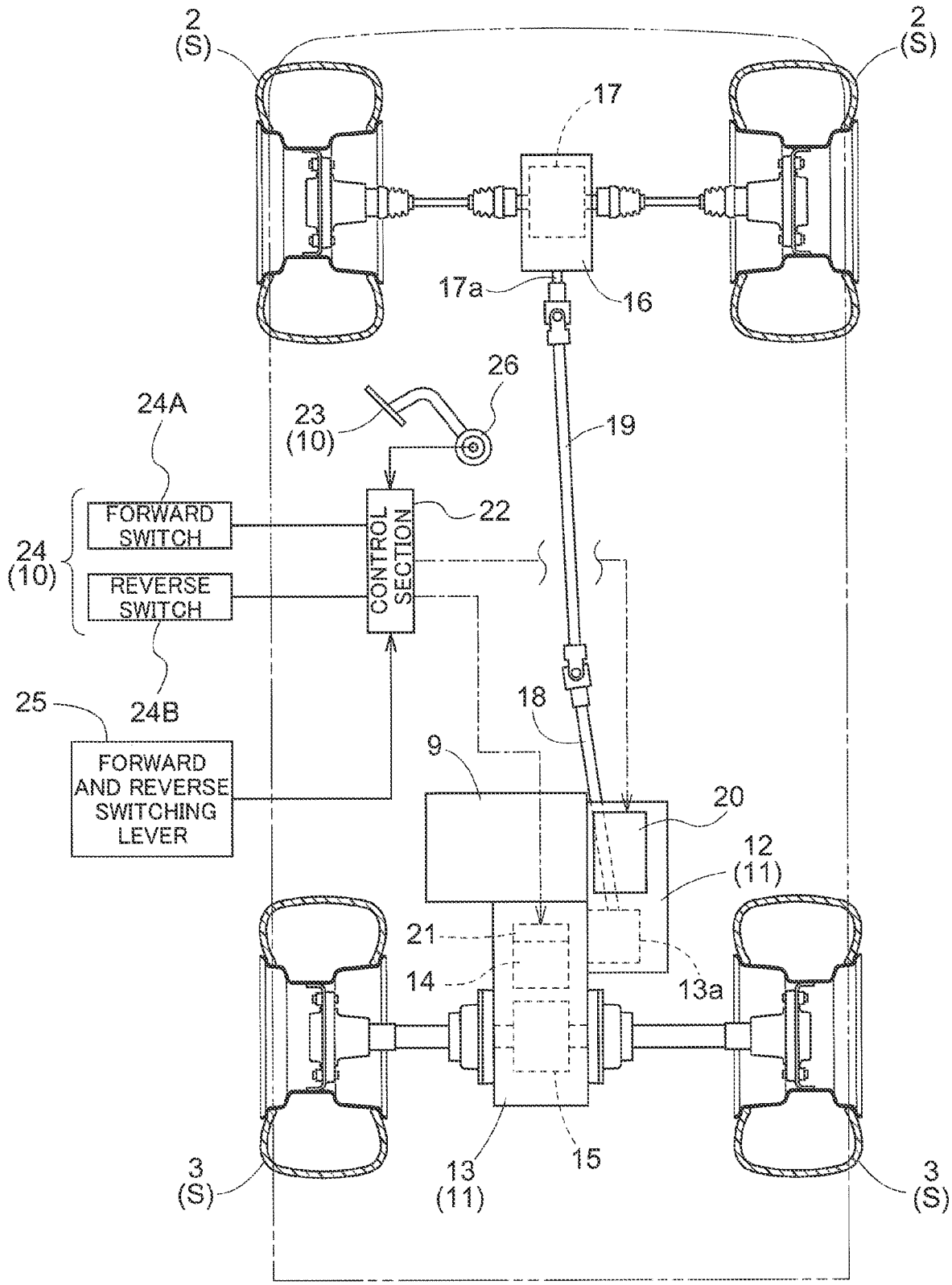
FIG. 2 is a diagram showing a control configuration and a power transmission system.

The power transmission structure is configured as shown in FIG. 2. This work vehicle includes the engine 9 as a drive source, and motive power is transmitted from the engine 9 to the front wheels 2 and the rear wheels 3. The work vehicle is also provided with a transmission device 11 capable of switching a speed change state based on a command from a speed change operation tool 10.

The transmission device 11 includes a continuous speed change section 12 including a hydrostatic continuously-variable transmission mechanism (HST) that can steplessly change a speed of the motive power of the engine 9, and a transmission case section 13 that is provided in a rear section of the engine 9 and has a gear-type transmission mechanism inside.

That is, as shown in FIG. 2, the continuous speed change section 12 is provided spanning from the lateral side of the engine 9 to the lateral side of the transmission case section 13. Inside the transmission case section 13, a forward and reverse switching mechanism 14 for switching the output after the speed change of the continuous speed change section 12 between a forward travel state and a reverse travel state, and a rear wheel differential mechanism 15 are installed as a gear-type transmission mechanism. Below the continuous speed change section 12, a front wheel output section 13a is formed on the lateral side of the transmission case section 13. A front wheel differential mechanism 17 is installed inside the front wheel drive case 16.

The motive power of the output shaft (not shown) of the engine 9 is input to the continuous speed change section 12 and the output of the continuous speed change section 12 is input to the transmission case section 13. The motive power input to the transmission case section 13 is branched and transmitted to the rear wheel transmission system and the front wheel transmission system. The motive power transmitted to the rear wheel transmission system is input to the rear wheel differential mechanism 15 and transmitted from the rear wheel differential mechanism 15 to the left and right rear wheels 3. The motive power transmitted to the front wheel transmission system is transmitted from the front wheel output section 13a to an input shaft 17a of the front wheel differential mechanism 17 via a first rotating shaft 18 and a second rotating shaft 19, and is transmitted from the front wheel differential mechanism 17 to the left and right front wheels 2.

The continuous speed change section 12 has a well-known configuration and therefore will not be described in detail, but includes a hydraulic pump and a hydraulic motor, and can change the drive speed steplessly by changing the angle of a swash plate. The change adjustment of the swash plate angle is performed by a first operation mechanism 20 for speed change, which includes, for example, a hydraulic cylinder, an electric motor, or the like.

The forward and reverse switching mechanism 14 is of a gear switching type, and can switch the motive power transmitted to the travel device S to a forward state and a reverse state. The switching operation of the forward and reverse switching mechanism 14 is performed with a second operation mechanism 21 for forward and reverse switching, which includes, for example, a hydraulic cylinder, an electric motor, or the like.

As shown in FIG. 2, the work vehicle includes a control section 22 that controls the operations of the first operation mechanism 20 and the second operation mechanism 21. The control section 22 has a microcomputer and executes control according to a pre-set control program.

The control section 22 switches the speed change state of the transmission device 11 based on a command from the speed change operation tool 10. Also, the work vehicle includes, as the speed change operation tool 10, a speed change pedal 23 serving as a main operation tool provided in the driving section 4, and an auxiliary operation tool 24 provided in a portion of the travel body 1 different from the driving section 4. The driving section 4 is also provided with a forward and reverse switching lever 25 as a forward and reverse switching operation tool for switching the forward direction when changing speed using the speed change pedal 23.

Figure 3:
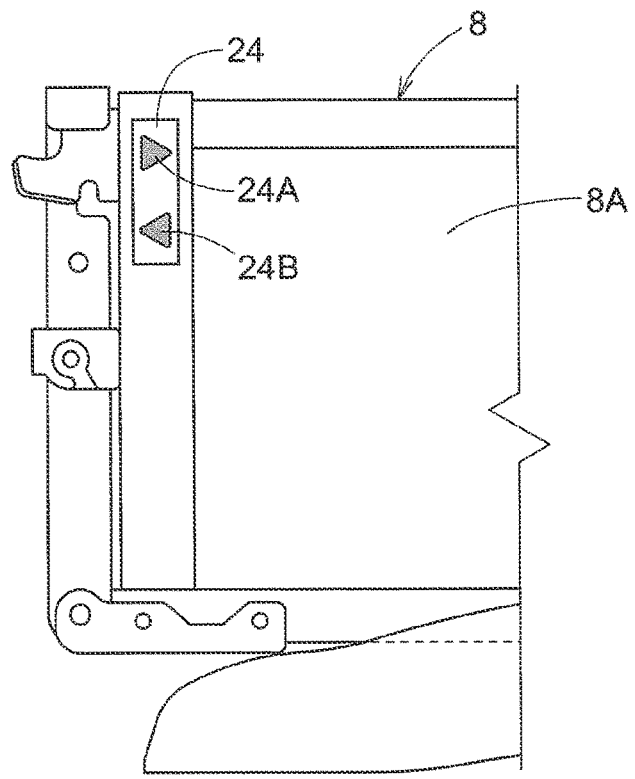
FIG. 3 is a side view showing an auxiliary speed change tool.
Figure 4:
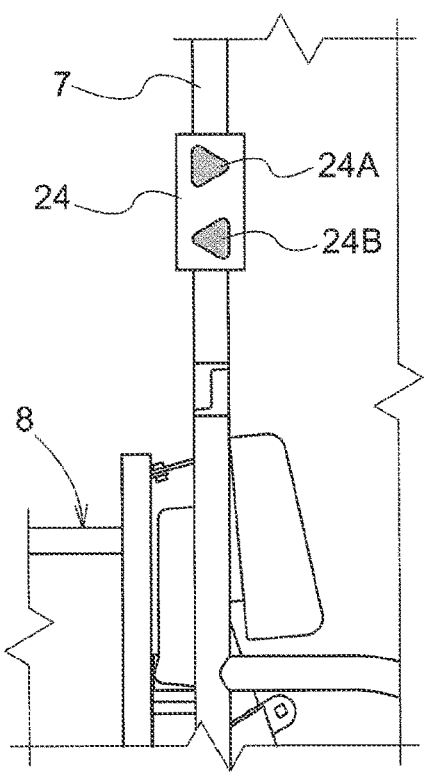
FIG. 4 is a side view showing an auxiliary speed change tool.

The auxiliary operation tool 24 is provided on the lateral side of the travel body 1 and at the rear end of the loading platform 8. Specifically, as shown in FIGS. 1, 3, and 4, the auxiliary operation tool 24 is provided at the rear end of a lateral side wall 8A of the loading platform 8. The auxiliary operation tool 24 includes a forward command switch 24A for commanding forward travel, and a reverse command switch 24B for commanding reverse travel. The forward command switch 24A and the reverse command switch 24B are push-operated switches.

Also, an auxiliary operation tool 24 is provided on the lateral side of the travel body 1 and on the lateral side of the ROPS frame 7. The auxiliary operation tool 24 is the same as the one provided at the rear end of the loading platform 8 in that it includes a forward command switch 24A and a reverse command switch 24B for commanding reverse travel.

[Speed Change Operation Performed with Speed Change Pedal]

Although not shown in the drawings, the speed change pedal 23 is biased to return to an upper neutral position, and can be operated by the driver by pressing with his or her foot against the return biasing force. A potentiometer 26 for detecting the amount of depression of the speed change pedal 23 is provided, and the detected value of the potentiometer 26 is input to the control section 22.

When forward travel is to be performed, a speed change operation is performed with an operation of the speed change pedal 23 while the forward and reverse switching lever 25 is switched to the forward side, and when reverse travel is to be performed, a speed change operation is performed with an operation of the speed change lever 23 while the forward and reverse switching lever 25 is switched to the reverse side.

The control section 22 controls the operation of the second operation mechanism 21 such that the forward and reverse switching mechanism 14 switches to the forward state in response to the forward and reverse switching lever 25 being switched to the forward side, and controls the operation of the second operation mechanism 21 such that the forward and reverse switching mechanism 14 switches to the reverse state in response to the forward and reverse switching lever 25 being switched to the reverse side. Then, the control section 22 controls the operation of the first operating mechanism 20 such that the vehicle speed increases according to the depression amount of the speed change pedal 23 detected by the potentiometer 26. While the speed change pedal 23 is not depressed, the continuous speed change section 12 is in a neutral state, and travel is stopped. When the speed change pedal 23 is depressed, the vehicle speed increases the more the depression amount increases.

[Speed Change Operation with Auxiliary Operation Tool]

Since the auxiliary operation tool 24 is provided at the rear end of the loading platform 8 and the ROPS frame 7, when the driver disembarks from the driving section 4 and is loading or unloading cargo onto or from the loading platform 8, the auxiliary operation tool 24 is located near the driver. Accordingly, by operating the auxiliary operation tool 24, the driver can move the travel body 1 without returning to the driving section 4.

In response to the driver issuing a command to travel forward by pressing the forward command switch 24A of the auxiliary operation tool 24, the control section 22 controls the operation of the second operation mechanism 21 such that the forward and reverse switching mechanism 14 switches to the forward state, and furthermore controls the operation of the first operation mechanism 20 such that the output after the speed change by the continuous speed change section 12 switches to a low-speed travel state approximately corresponding to a walking speed.

In response to the driver issuing a command to travel in reverse by pressing the reverse command switch 24B of the auxiliary operation tool 24, the control section 22 controls the second operation mechanism 21 such that the forward and reverse switching mechanism 14 switches to the reverse state, and furthermore controls the operation of the first operation mechanism 20 such that the output after the speed change by the continuous speed change section 12 switches to a low-speed travel state approximately corresponding to the walking speed.

The forward command switch 24A and the reverse command switch 24B in the auxiliary operation tool 24 are both used to command forward travel and reverse travel due to a push operation, and in response to the operator removing his or her hand and releasing the push operation, the command is removed, and the travel body 1 enters a travel stop state.

Other Embodiments (1) In the above-described embodiment, the auxiliary operation tool 24 is provided on the lateral side of the travel body 1 and at the rear end of the loading platform 8. However, there is no limitation to such a configuration, and the auxiliary operation tool 24 can be provided at a location other than the rear end of the loading platform 8 as a location in the travel body 1 different from the driving section 4. Also, the auxiliary operation tool 24 may be provided at a lateral side of the travel body 1 and at an intermediate portion in the front-rear direction of the lateral side wall 8A of the loading platform 8 while facing laterally outward.

The auxiliary operation tool 24 may also be provided at a location other than the rear end of the lateral side wall 8A of the loading platform 8, the ROPS frame 7, and the intermediate portion in the front-rear direction of the lateral side wall 8A of the loading platform 8. For example, the auxiliary operation tool 24 may also be provided at a location different from the lateral side of the travel body 1, specifically, at an intermediate portion in the left-right direction of the rear section of the loading platform 8.

The auxiliary operation tool 24 may be provided only at one of the above locations, or may be provided at each of the above locations at the same time, and the installation location is not limited to the illustrated locations.

Figure 5:
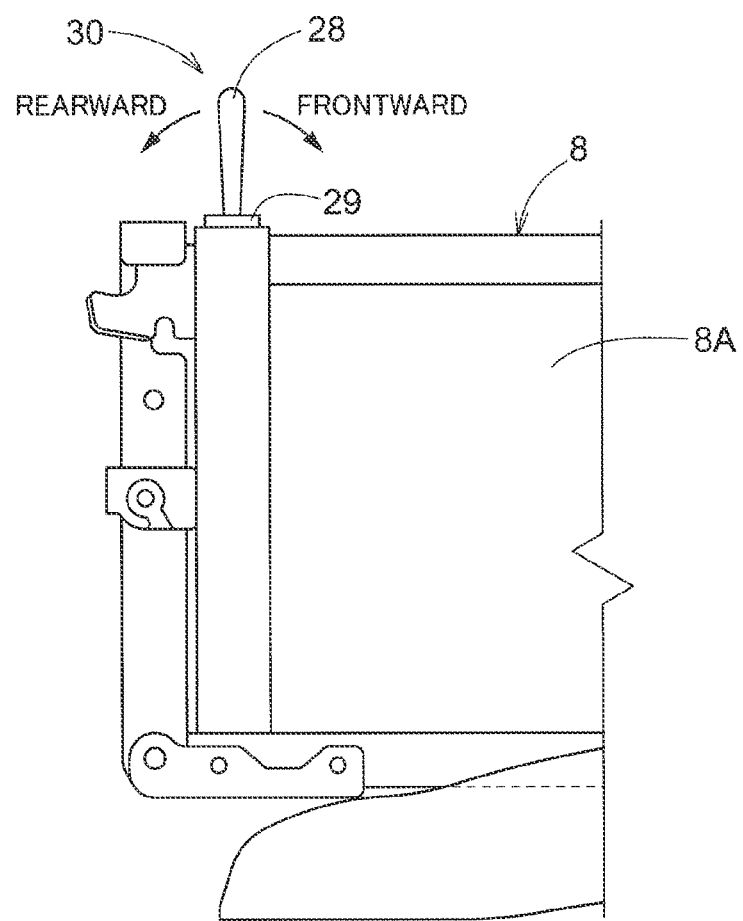
FIG. 5 is a side view showing an auxiliary speed change tool according to another embodiment.

(2) The above-described embodiment showed that the auxiliary operation tool 24 is configured as a push-operated switch. However, the auxiliary operation tool 24 may also be configured as a lever switch 30 that can be switched to a neutral state and a travel command state, and is biased to return to the neutral state. That is, as shown in FIG. 5, the auxiliary operation tool 24 may also be a joystick-shaped lever switch 30 that is supported by a rod-shaped operation tool 28 so as to be swingable at a base end 29, and that can perform a swinging operation in a front-rear direction from a neutral position. In this configuration, the operation tool 28 is biased to return to the neutral position, and when it is swung forward, forward travel is commanded, and when it is swung rearward, reverse travel is commanded.

(3) In the above-described embodiment, when travel is commanded using the auxiliary operation tool 24, the state is switched to a low-speed travel state approximately corresponding to the walking speed. However, various configurations can be used instead of this configuration, such as a configuration in which the vehicle moves at high speed for a set short amount of time each time travel is commanded with the auxiliary operation tool 24, or a configuration in which such short-term high-speed movement is repeated.

(4) In the above embodiment, the work vehicle uses the engine 9 as the drive source for the travel body 1, and the motive power of the engine 9 is changed by the hydrostatic continuously-variable transmission device (HST). However, instead of such a configuration, the work vehicle may use an electric motor as a drive source, the output of the electric motor may be changed and adjusted by an inverter, and the controller 22 may control the operation of the inverter.

INDUSTRIAL APPLICABILITY

The present invention can be applied to a work vehicle including a travel body with a rear section provided with a loading platform on which cargo can be loaded.

What is claimed is:

1. A work vehicle, comprising a travel body having a rear section provided with a loading platform on which cargo is placeable,
   wherein the travel body comprises:
   a motor section;
   a travel device;
   a driving section rideable by a driver;
   at least one speed change operation tool configured to give a command regarding a speed change operation; and
   a transmission device configured to change a speed of motive power of the motor section and transmit the changed motive power to the travel device, and switch a speed change state based on the command from the at least one speed change operation tool, and
   wherein the at least one speed change operation tool comprises a main operation tool provided in the driving section, and an auxiliary operation tool provided at a location in the travel body different from the driving section.

2. The work vehicle according to claim 1, wherein the auxiliary operation tool is provided on a lateral side of a body of the work vehicle.

3. The work vehicle according to claim 2,
   wherein the driving section is provided with a ROPS frame, and
   wherein the auxiliary operation tool is provided on the ROPS frame.

4. The work vehicle according to claim 1, wherein the auxiliary operation tool is provided on the loading platform.

5. The work vehicle according to claim 4, wherein the auxiliary operation tool is provided at a rear end portion of the loading platform.

6. The work vehicle according to claim 1, wherein in response to a travel command from the auxiliary operation tool, the transmission device switches to a low-speed travel state approximately corresponding to a walking speed.

7. The work vehicle according to claim 1, wherein the auxiliary operation tool is a push-operated switch configured to give a travel command in response to being pushed.

8. The work vehicle according to claim 1, wherein the auxiliary operation tool is a lever switch configured to switch between a neutral state and a travel command state, and biased to return to the neutral state.

* * * * *